Patented Sept. 4, 1928.

1,682,857

UNITED STATES PATENT OFFICE.

PHILIP SCHIDROWITZ, OF LONDON, ENGLAND, ASSIGNOR TO VULTEX LIMITED, OF JERSEY, CHANNEL ISLANDS, ENGLAND, A JERSEY COMPANY.

MANUFACTURE OF RUBBER AND THE LIKE.

No Drawing. Application filed March 14, 1923, Serial No. 625,171, and in Great Britain September 14, 1922.

The present invention is for improvements in or relating to the manufacture of caoutchouc compositions.

In my U. S. patent specification No. 1,443,149 I have described the manufacture of vulcanized rubber compositions by submitting latex in the uncoagulated state to vulcanization with sulphur or other vulcanizing agent under such conditions as to preclude coagulation, or any substantial coagulation of the rubber during vulcanization.

The present invention consists in a modification of the process of the aforesaid specification, and is characterized essentially by vulcanizing the latex-mixing under the conditions prescribed at a temperature below that ordinarily employed in hot methods of vulcanization.

In the case of the present invention, therefore, as in that of specification No. 1,443,149, latex is vulcanized without prior coagulation of the caoutchouc, and under conditions precluding this change during the vulcanization.

To render the process reasonably expeditious, the latex-mixing preferably comprises an active accelerator of vulcanization. The nature and the proportion employed of such accelerator are dependent upon circumstances, such as the composition of the vulcanizable mixing, the condition or concentration of the latex and the nature of any preservative present therein, but the conditions of operation in any given case may be readily determined by a simple preliminary trial. A nitrogenous organic base, such as piperidine derivatives, for instance, in the form of the accelerator prepared according to U. S. patent specification No. 1,418,976, may advantageously be utilized. The invention is, however, not limited in respect to the use of a particular accelerating agent, and I have found that active accelerators, whether water-soluble or not, may be employed.

The vulcanizable mixing may be left to stand at the ordinary temperature, or may be heated at that of the water-bath or at a suitable temperature below the usual boiling-point of water, until vulcanization has been effected; or the process may be commenced at a substantially normal temperature, for instance, at about 15° C., and the vulcanization completed by subsequent application of heat within the limit aforesaid.

The presence of rubber coagulants in the vulcanizable latex-mixing is to be avoided, and in order to prevent coagulation during the vulcanization the latex or other caoutchouc-containing material may be rendered definitely alkaline or definitely basic prior to treatment. It is preferred to work with definitely alkaline or definitely basic mixings, although with fresh latex quite a low degree of alkalinity may suffice and may even not be necessary in certain cases when the latex displays little tendency to coagulation.

By "definitely alkaline" or "definitely basic" is meant either alkaline or not acid to an appropriate indicator which, of course, will be selected according to the reagent employed for providing the basicity of the mixing.

The latex may be rendered alkaline or basic by the addition of ammonia, or like base, or of a sufficiency of an accelerator such as piperidine, or the alkali may be a component of the vulcanizing agent such, for instance, as an alkaline polysulphide. The latex may be diluted with water prior to vulcanization or preparation of the mixing. Some latices may be worked at full strength while in the case of others a greater or lesser degree of dilution with water may be advantageous, for instance, as an aid to preventing coagulation during the vulcanizing process, or to obtaining a vulcanized aqueous product of desired low concentration.

The vulcanization may be so carried out that the vulcanized caoutchouc-component partly or wholly separates from the aqueous reaction-mixture in a coalesced (but not coagulated) form, or a solution or comparable colloid suspension of the vulcanized product in water may be obtained, according to the conditions of working, for instance, the composition of the mixing or the manner of vulcanization.

The vulcanized product may be separated from the reaction mixture by any desired method, for example, by evaporation of the liquid after straining if required, or by addition to the liquid of coagulants, for instance, a suitable salt such as Epsom salts (e. g. 5 to 15 per cent of a 20 per cent aqueous solution), or an acid such as sulphuric or acetic acid of appropriate dilution (e. g. 5 per cent solutions).

The separated material is a vulcanized product which may be washed, milled, sheeted, or otherwise treated in order to obtain it in relatively pure form and of any desired shape, in the same manner as any known rubber coagulum is washed, milled or sheeted. The drying of the vulcanized crepe or sheet may be effected by any convenient process, such as is employed in the case of ordinary (unvulcanized) raw rubber crepe or sheet, or other form of raw rubber derived from the original coagulum.

Fibrous materials, and other fillers or binders, pigments, dyes or other compounding materials may be added at any suitable stage of the process.

The vulcanized product in coalesced form, or the vulcanized liquid may be applied to fabrics, paper, woven fibres such as ropes, cords, threads, nets or the like, by spreading, spraying, dipping or other operations as may be convenient according to the nature of the material such treated fabrics, fibres or other material being subsequently dried wholly or partly by any suitable method of evaporation. Coagulants may be used but as a rule are not necessary.

When wholly or partly dried the treated material may be washed with water or with a dilute aqueous acid for the purpose of improving the finish or a dilute alkali may be employed, according to the nature of the rubber film or the material upon which it is deposited.

Alternatively, or in combination with the foregoing washing with water or acid or alkaline solutions, the dry or substantially dry goods may be passed through or have applied to them a dilute solution of a gel-forming substance, preferably under slight application of heat. For example, the goods may be treated with a warm dilute aqueous solution of gelatine or agar-agar (say 0.25–1.0 per cent strength), a treatment which facilitates handling of the goods and has a protective action upon their surfaces, as well as assisting to improve the finish.

The following examples will indicate how the invention may be carried into effect, and it will be appreciated that these examples are furnished for illustrative purposes and not by way of limitation.

*Example I.*

To 200 cc. of latex, contained 30 per cent of rubber, admixed with a solution of sodium polysulphide, assaying about 25 per cent of precipitable sulphur, in the proportion of 1 part of the sulphide solution to 12 parts of the latex, were added, in the form of a thin cream made with about 20 cc. of water, 10 grams of an accelerator prepared according to the specification of U. S. Patent No. 1,418,976, this accelerator consisting of zinc oxide carrying about 6 per cent of piperidyldithiocarbamate of piperidine.

The mixing was allowed to stand at the ordinary temperature, about 15° C., during three days, at the end of which time the whole had coalesced to a thickened mass, the solids of which consisted of a vulcanized rubber composition.

*Example II.*

To 200 cc. of latex containing 30 per cent of rubber and preserved with 1 per cent of ammonium hydrate there was added a cream made by mixing 15 to 20 cc. of water with 3 grams of the same accelerator given in Example I, 6 grams of sulphur and 3 grams of zinc oxide. The mixing was allowed to stand for about three days at the ordinary temperature during which period slight thickening took place. The mixing was then transferred to a flask which was immersed in a boiling water-bath. After about 2½ to 3 hours there was obtained a coalesced mass of vulcanized rubber.

*Example III.*

A mixing prepared according to Example II was left to stand for five days at ordinary temperature. At the end of this period the mixing displayed slight thickening, but was perfectly mobile and gave no evidence either of coagulation or coalescence. After straining to remove zinc oxide, excess sulphur and accelerator, application of the usual tests to the rubber obtained from the strained fluid showed this rubber to be in the vulcanized condition.

*Example IV.*

To 2000 cc. of latex, containing 30 per cent of rubber and preserved with 1 per cent of ammonia, there was added a cream composed of 40 grams of sulphur, 20 grams of zinc oxide, 6 grams of the carbon bisulphide derivative of di-ethylamine, and 150 cc. of water, slightly alkaline with ammonia. After agitation for a brief period in order to disperse the cream, the mixing was left to stand for four days at room temperature, with agitation once or twice a day. No appreciable thickening of the mixing was observable at the end of this period. The reaction mixture was perfectly mobile and gave no evidence either of coagulation or of coalescence. After straining to remove zinc oxide, excess of sulphur and accelerator, application of the usual tests to the rubber from the stained fluid showed this rubber to be in the vulcanized condition.

*Example V.*

A mixing prepared according to Example

IV was heated for 30 minutes at 70° C. (after a rise of about 20 to 30 minutes). The reaction-product was strained. The resulting fluid displayed neither coagulation nor coalescence, and the rubber obtained was found to be in a well vulcanized condition.

*Example VI.*

A mixing prepared and treated according to Example IV, with the exception of the replacement of the 6 grams of the carbon bisulphide derivative of di-ethylamine by the same weight of the carbon bisulphide derivative of piperidine, was found on standing to thicken slightly, although there was no evidence of either coagulation or coalescence. The mixing was left to stand for four days, and was then strained. Application of the usual tests to the rubber showed the latter to be vulcanized. Indeed in this case a slightly over-vulcanized product was obtained.

*Example VII.*

A mixing prepared and treated according to Example V with the exception of the substitution of the piperidine derivative of carbon bisulphide for the corresponding derivative of di-ethylamine, also displayed slight thickening but without coagulation or coalescence. After straining, examination in the usual way showed the rubber to be a fully vulcanized product.

*Example VIII.*

A mixing was made up consisting of 200 cc. of latex, preserved with 1.5 per cent of ammonia, 76 cc. of water, 3 grams of colloidal sulphur, 0.6 grams of the carbon bisulphide derivative of piperidine, and 1 gram of zinc oxide in the form of zinc hydrate in solution in slight excess of ammonia. This mixing was left to stand at a low room temperature (4–10° C.) for about twelve hours, and then after straining was divided into two portions. One portion was coagulated by addition of dilute acetic acid, and the other portion was evaporated to dryness at a temperature of about 25° C. Application of the usual tests to the washed and dried coagulum and to the residue obtained by evaporation proved both products to consist of well vulcanized rubber.

It will be observed in the above example that only about half a day was required for the vulcanization although the temperature at which this change was effected was unusually low. It appears that certain substances such as zinc oxide act to a lesser or greater extent as promoters to the active accelerator present in the mixing, and that the rate of cure of the latter increases with the state of sub-division of the promoter. Advantage may be taken of this superior promoting action consequent upon a fine state of sub-division in order to expedite the vulcanization provided that the quantity of the promoter in the reaction-mixture proportionately to the vulcanizing agent be not so great as to induce coagulation during the vulcanizing process. Thus, if with a given mixing coagulation sets in, the quantity of the promoter must be reduced, or the relative proportions of promoter and vulcanizing agent readjusted, but with any given new mixing such adjustment of relative quantities is a matter for simple preliminary trial. In the case of zinc oxide, the increased accelerating effect referred to becomes noticeable with a state of sub-division finer than that of the commercial product usually employed and such finer state of division is apparently most advantageously of the order of colloid dimensions of particle, such, for example, as may reasonably be expected to exist in a solution of the hydrate of this metal in an alkali.

In the preparation of rubber compositions by direct vulcanization of uncoagulated latex, the danger of fire and the toxic effects associated with the use of the usual rubber solvents are avoided, and these advantages attach not only to the process of manufacture of the composition but also to the applications of the vulcanized product. For example, in the impregnation or coating of fabrics drying may be effected before an open fire if desired. A further advantage is that the odour, if any, of the residue obtained by evaporation of the vulcanized latex is unobjectionable, whereas a certain peculiar odour is almost always left on evaporation of solutions of rubber in the usual commercial solvents. The low temperature vulcanization characteristic of the present invention constitutes a process of manufacture both economical and simple in operation in that pressure-heating or closed vessels need not be employed, with consequent simplification and saving of plant, together with ease and simplicity of working and economy in heat energy. In addition, products cured at low temperatures in presence of an active accelerator according to this invention are in general tougher and age better than products obtained by the hot cure of rubber as usually practiced, a superiority comparable in these respects to that displayed by products prepared by a short hot cure with an active accelerator over those obtained by long ordinary hot vulcanization.

I claim:

1. The process for the manufacture of vulcanized compositions which comprises substantially uncoagulated caoutchouc at a temperature below those ordinarily employed in hot vulcanizing methods under such conditions as to preclude any substantial coagulation of the caoutchouc during the vulcanization.

2. The process for the manufacture of vulcanized compositions which comprises vulcanizing an aqueous substantially uncoagulated caoutchouc suspension at a temperature below those ordinarily employed in hot vulcanizing methods under such conditions as to preclude any substantial coagulation of the caoutchouc during the vulcanization.

3. The process for the manufacture of vulcanized compositions which comprises vulcanizing a vulcanizable plant latex at a temperature below those ordinarily employed in hot vulcanizing methods under such conditions as to preclude any substantial coagulation of the vulcanizable material during the vulcanization.

4. The process for the manufacture of vulcanized rubber compositions which comprises vulcanizing substantially uncoagulated rubber latex at a temperature below those ordinarily employed in hot vulcanizing methods under such conditions as to preclude any substantial coagulation of the rubber during the vulcanization.

5. The process for the manufacture of vulcanized rubber compositions which comprises vulcanizing substantially uncoagulated rubber latex in presence of an accelerator of vulcanization at a temperature below those ordinarily employed in hot vulcanizing methods under such conditions as to preclude any substantial coagulation of the rubber during the vulcanization.

6. The process for the manufacture of vulcanized rubber compositions which comprises vulcanizing substantially uncoagulated rubber latex in presence of an accelerator of vulcanization and a promoter for said accelerator at a temperature below those ordinarily employed in hot vulcanizing methods under such conditions as to preclude any substantial coagulation of the rubber during the vulcanization.

7. The process for the manufacture of vulcanized rubber compositions which comprises vulcanizing substantially uncoagulated rubber latex in an alkaline condition in presence of an accelerator of vulcanization at a temperature below those ordinarily empoyed in hot vulcanizing methods.

8. The process for the manufacture of vulcanized rubber compositions which comprises vulcanizing substantially uncoagulated rubber latex in an alkaline condition in presence of an accelerator of vulcanization and a promoter for said accelerator at a temperature below those ordinarily employed in hot vulcanizing methods under such conditions as to preclude any substantial coagulation of the rubber during the vulcanization.

9. The process for the manufacture of vulcanized rubber compositions which comprises vulcanizing substantially uncoagulated rubber latex in an alkaline condition in presence of an eccelerator of vulcanization and a colloid at a temperature below those ordinarily employed in hot vulcanizing methods under such conditions as to preclude any substantial coagulation of the rubber during the vulcanization.

10. The process for the manufacture of vulcanized rubber compositions which comprises vulcanizing substantially uncoagulated rubber latex in alkaline condition in presence of an accelerator of vulcanization and of colloidal zinc oxide at a temperature below those ordinarily employed in hot vulcanizing methods under such conditions as to preclude any substantial coagulation of the rubber during the vulcanization.

11. The process for the manufacture of vulcanized rubber compositions which comprises vulcanizing substantially uncoagulated rubber latex in presence of an accelerator of vulcanization at a temperature below 100° C. under such conditions as to preclude any substantial coagulation of the rubber during the vulcanization.

12. The process for the manufacture of vulcanized rubber compositions which comprises vulcanizing substantially uncoagulated rubber latex in an alkaline condition in presence of an accelerator of vulcanization at a temperature below 100° C.

13. The process for the manufacture of vulcanized rubber compositions which comprises vulcanizing substantially uncoagulated rubber latex in an alkaline condition in presence of an accelerator of vulcanization at a substantially constant temperature below 100° C.

14. The process for the manufacture of vulcanized rubber compositions which comprises vulcanizing substantially uncoagulated rubber latex in an alkaline condition in presence of an accelerator of vulcanization, and of a promoter for said accelerator at a substantially constant temperature below 100° C. under such conditions as to preclude any substantial coagulation of the rubber during the vulcanization.

15. The process for the manufacture of vulcanized rubber compositions which comprises vulcanizing substantially uncoagulated rubber latex in an alkaline condition in presence of an accelerator of vulcanization and of colloidal zinc oxide at a substantially constant temperature below 100° C. under such conditions as to preclude any substantial coagulation of the rubber during the vulcanization.

16. The process for the manufacture of vulcanized rubber compositions which comprises vulcanizing substantially uncoagulated ammonical rubber latex in presence of an accelerator of vulcanization at a temperature below these ordinarily employed in hot vulcanizing methods.

17. The process for the manufacture of vulcanized rubber compositions which comprises vulcanizing substantially uncoagulated rubber latex with an alkaline vulcanizing agent in presence of an accelerator of vulcanization at a temperature below those ordinarily employed in hot vulcanizing methods.

18. The process for the manufacture of vulcanized rubber compositions which comprises vulcanizing rubber latex in an alkaline condition in presence of an accelerator of vulcanization at a temperature below those ordinarily employed in hot vulcanizing methods, embodying the vulcanized product with a solid material and evaporating the liquid to deposit the vulcanized rubber upon said material.

19. The process for the manufacture of vulcanized rubber compositions which comprises vulcanizing substantially uncoagulated rubber latex in an alkaline condition in presence of an accelerator of vulcanization at a temperature below those ordinarily employed in hot vulcanizing methods, embodying the vulcanized rubber with a solid material, evaporating the liquid to deposit the rubber upon said material and washing the substantially dried rubberized product.

20. The process for the manufacture of vulcanized rubber compositions which comprises vulcanizing substantially uncoagulated rubber latex in an alkaline condition in presence of an accelerator of vulcanization at a temperature below those ordinarily employed in hot vulcanizing methods, embodying the vulcanized product with a solid material, evaporating the liquid to deposit the rubber upon said material, and treating the substantially dried rubberized product with a dilute solution of a gel-forming substance.

21. The process for the manufacture of vulcanized rubber compositions which comprises vulcanizing substantially uncoagulated rubber latex in an alkaline condition in presence of an accelerator of vulcanization at a temperature below those ordinarily employed in hot vulcanizing methods, embodying the vulcanized product with a solid material, evaporating the liquid to deposit the rubber upon said material, and treating the substantially dried rubberized product with a dilute solution of gelatine.

22. The process for the manufacture of vulcanized rubber compositions which comprises vulcanizing substantially uncoagulated rubber latex in an alkaline condition in presence of an accelerator of vulcanization at a temperature below those ordinarily employed in hot vulcanizing methods, embodying the vulcanized product with a solid material, evaporating the liquid to deposit the rubber upon said material, washing the substantially dried rubberized product and treating the washed product with a dilute solution of gelatine.

23. A vulcanized aqueous substantially uncoagulated caoutchouc suspension vulcanized without substantial coagulation of the caoutchouc at a temperature below those ordinarily employed in hot vulcanizing methods.

24. Vulcanized substantially uncoagulated rubber latex vulcanized without substantial coagulation of the rubber at a temperature below those ordinarily employed in hot vulcanizing methods.

25. Vulcanized substantially uncoagulated coalesced rubber.

26. An article formed with vulcanized rubber prepared by vulcanization of substantially uncoagulated rubber latex at a temperature below those ordinarily employed in hot vulcanizing methods.

27. An article formed with vulcanized rubber compounded with a filling material and prepared by vulcanization of substantially uncoagulated rubber latex at a temperature below those ordinarily employed in hot vulcanizing methods.

28. An article formed with vulcanized rubber compounded with a fibrous filling material and prepared by vulcanization of substantially uncoagulated rubber latex at a temperature below those ordinarily employed in hot vulcanizing methods.

29. A process for manufacturing a fluid vulcanized caoutchouc composition which comprises mixing vulcanizing ingredients with an aqueous dispersion of rubber in the presence of an alkaline preservative, and agitating the mass at a temperature below approximately 212° F. until an aqueous dispersion of vulcanized rubber is obtained.

In testimony whereof I affix my signature.

PHILIP SCHIDROWITZ.